United States Patent Office 2,782,070
Patented Feb. 19, 1957

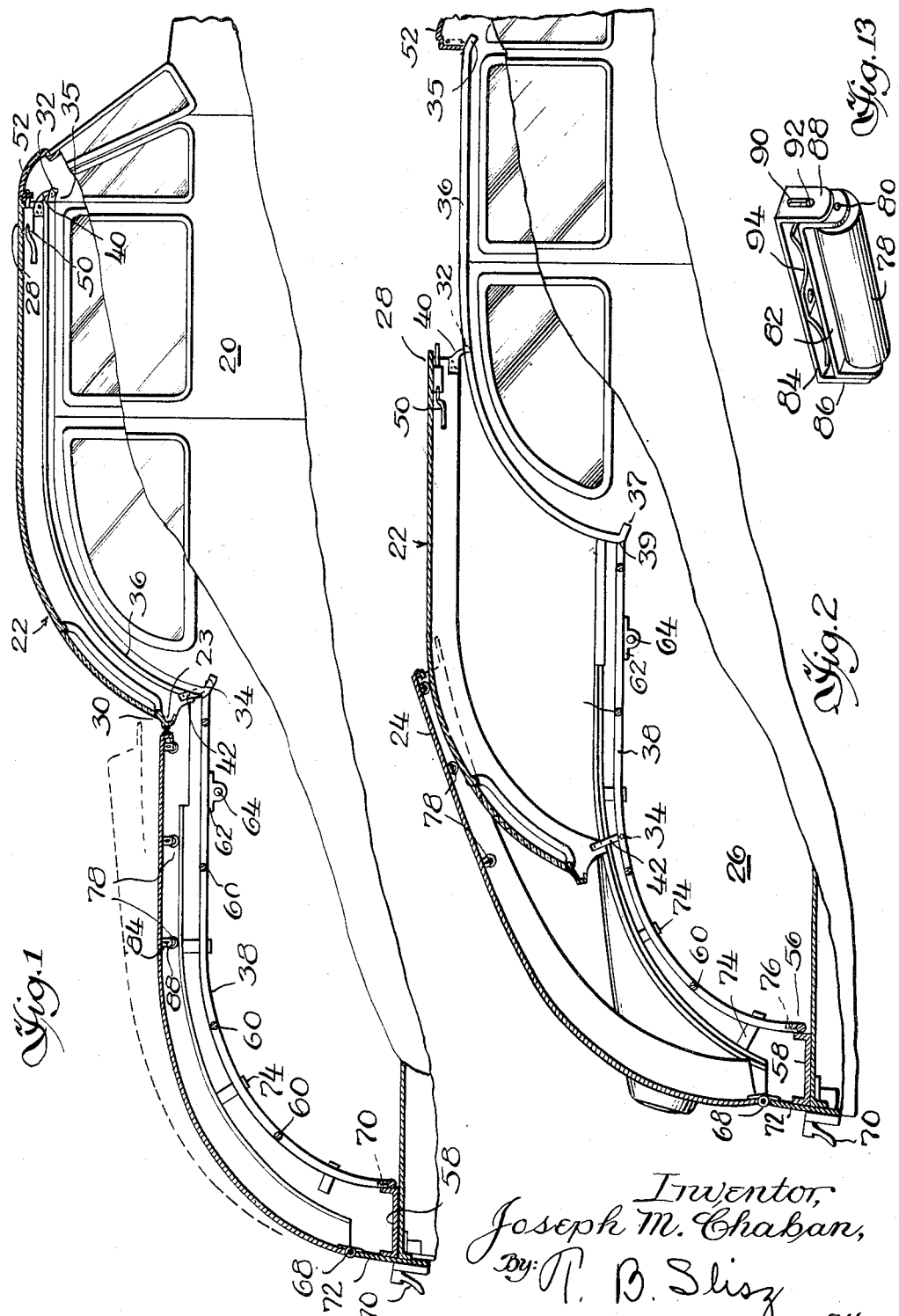

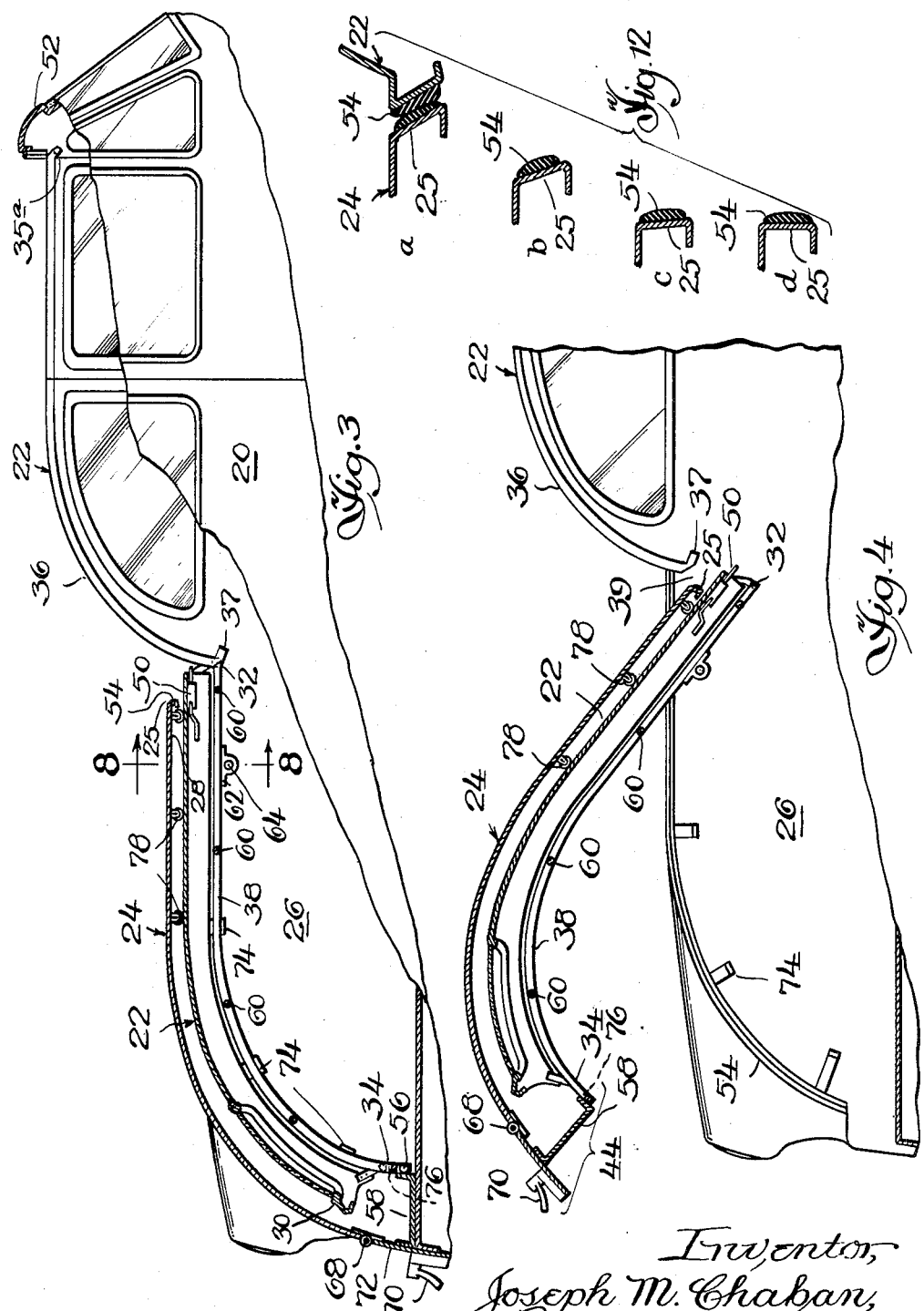

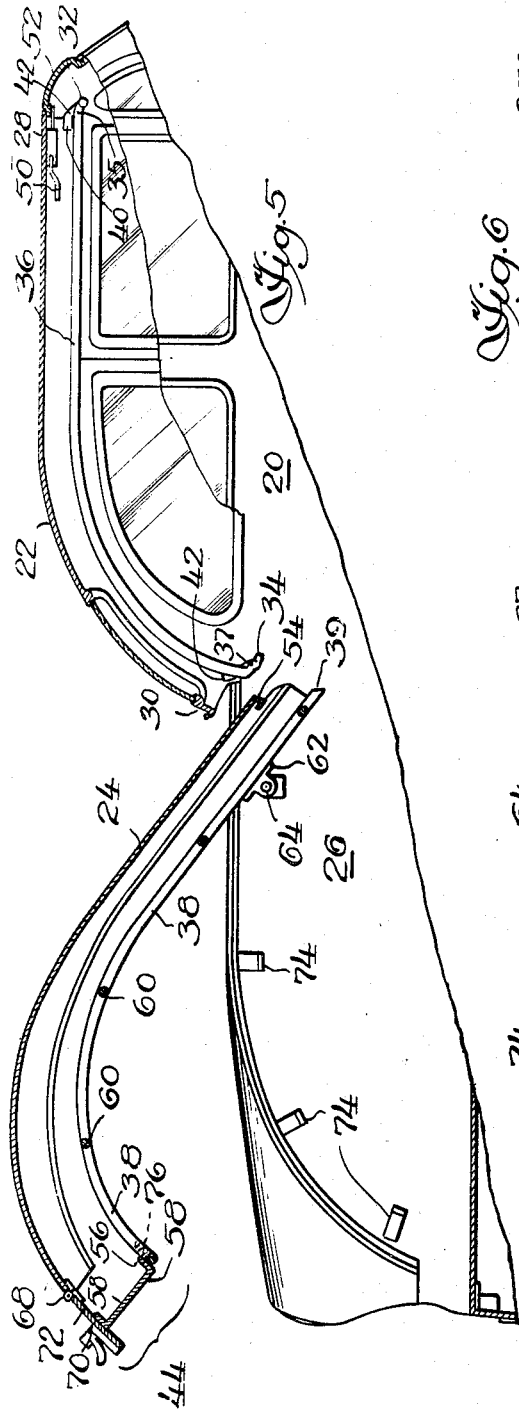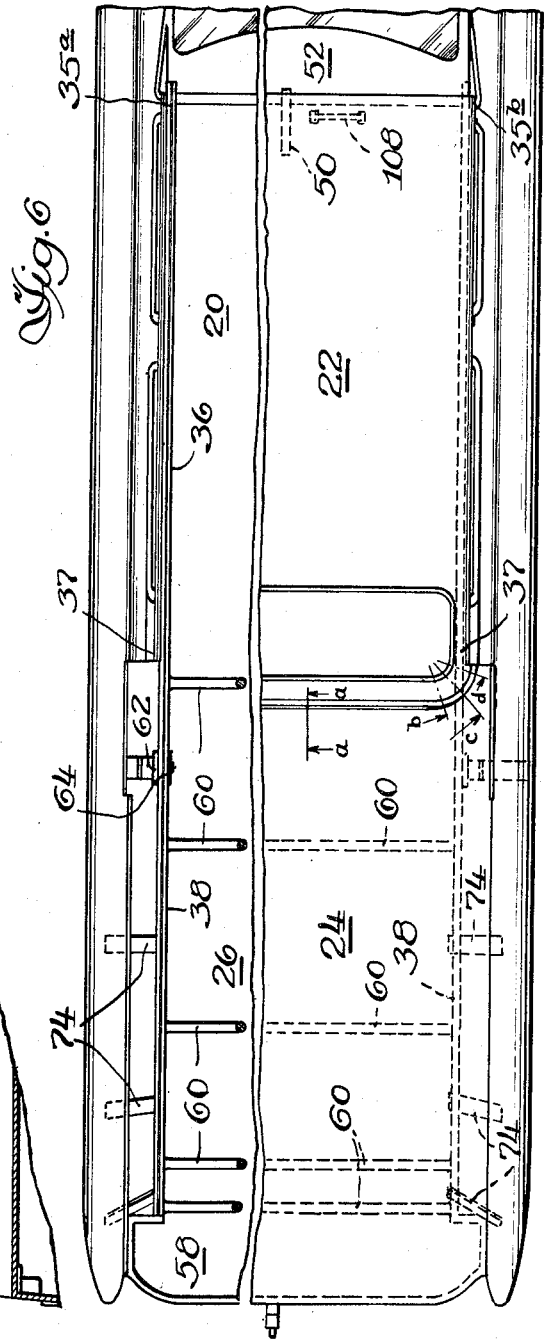

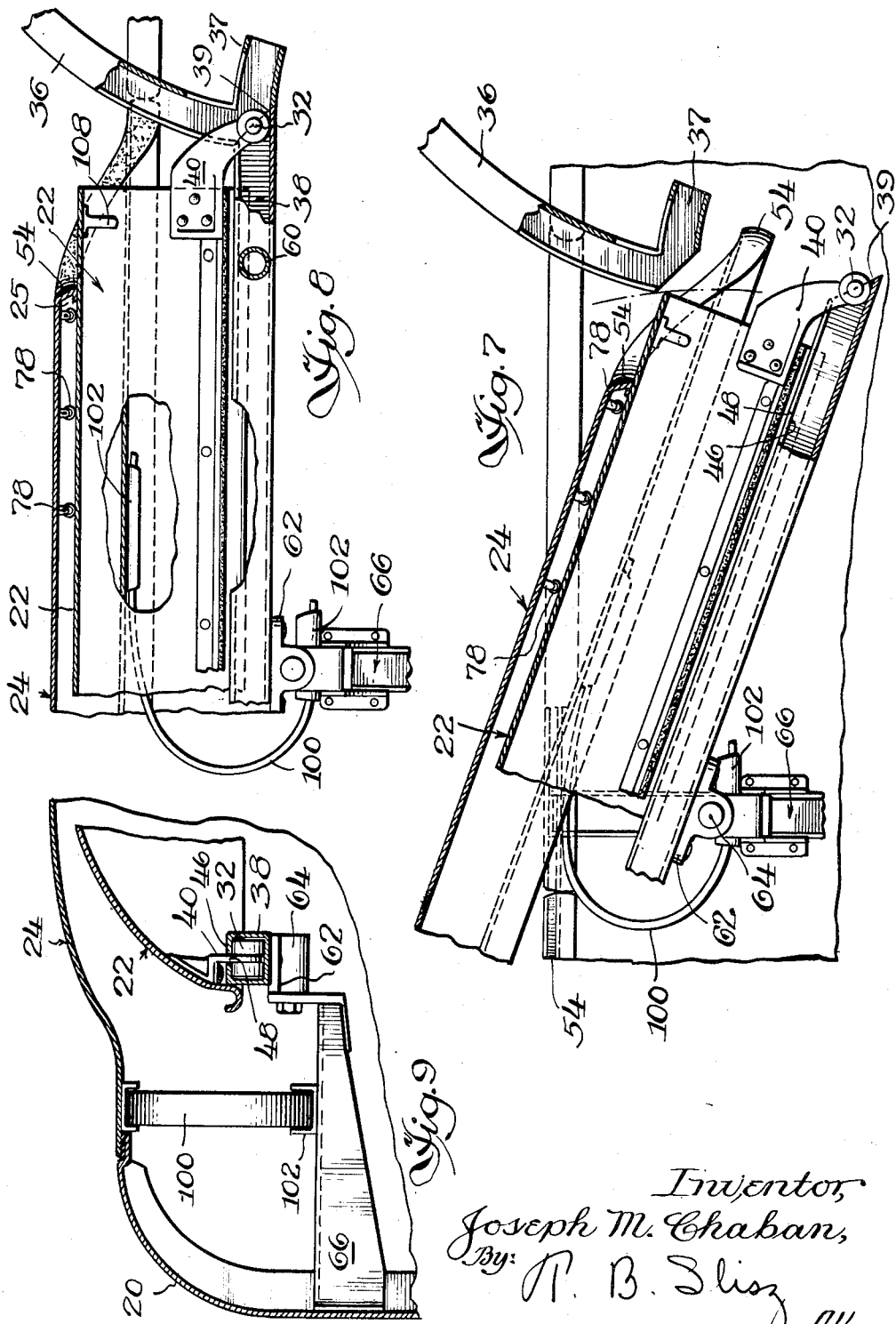

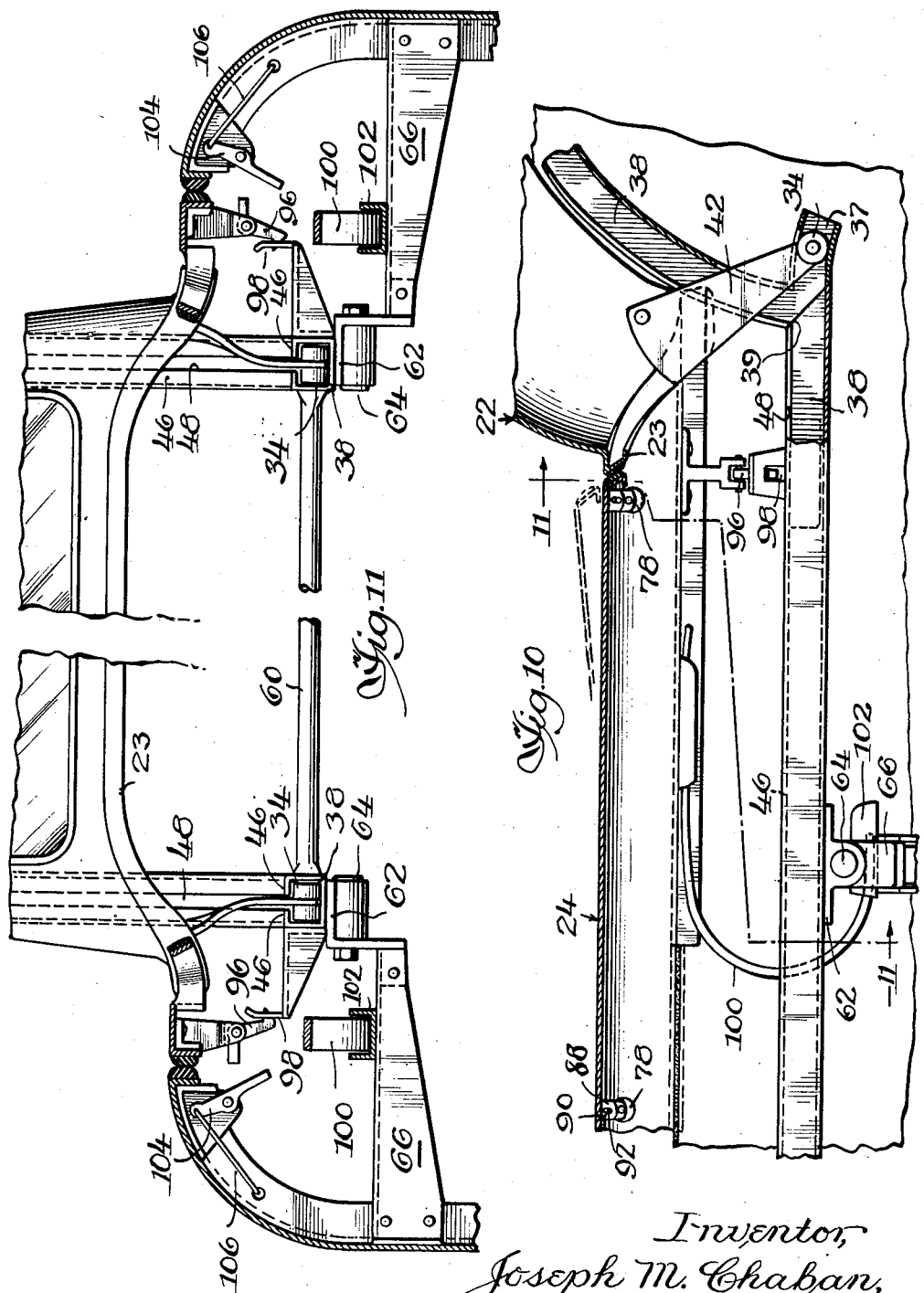

2,782,070

RETRACTABLE AUTOMOBILE ROOF TOP

Joseph M. Chaban, Bensenville, Ill.

Application December 31, 1953, Serial No. 401,615

12 Claims. (Cl. 296—107)

This invention is directed to automotive vehicles. More particularly it is directed to automobile tops of the type that can be removed and thus convert a closed automobile into an open vehicle.

At the present time, automobile manufacturers have attempted to supply the demand for so-called convertible automobiles by providing a folding top that when fully collapsed fits within a well and thus converts a closed car into an open or touring type of vehicle. However, it is a well known fact that in cases of upsets, or other type of vehicular accidents the convertible models not only lack safety but absolutely fail to protect the occupants against crushing. Therefore to overcome this marked lack of safety in the so-called convertible models of automobiles, many makers have brough out a model known as "hard tops" which have a fixed roof but resembling somewhat the folding type of the automobile body style. Clearly these are considerably more safter since they have a steel roof but cannot be collapsed or folded away.

A number of automobiles have been described in which the roof is retractable into another portion of the automobile but the means to accomplish this purpose have proven to be cumbersome, unreliable and greatly reduced the comfort, efficiency and utility of the vehicle.

It therefore is an object of my invention to provide a so-called hard top automobile roof structure that is safe and useful as well as ornamental, and at the same time retractable.

A further object of my invention is to provide a retractable steel roof top for automobiles that can be readily introduced into the present lines of continuous operations without costly changeovers and tooling.

A still further object of my invention is to provide a retractable automobile roof top that can be concealed within the body of the automobile without affecting the beautiful lines and functional design of the automobile.

Another object of my invention is to provide a mechanism for permitting the retraction of the automobile roof deck within the posterior portion of the automobile.

A still further and additional object, but not the final one, of my invention is to provide a mechanism as well as a hard top for an automobile which can be concealed within the trunk portion of the automobile and still permit the full use of the trunk, the trunk lid and provide ready accessibility to the interior of the trunk with ease and dispatch.

These and other objects, variations, adaptations, extensions and modifications will be clearly apparent to anyone skilled in these arts particularly in view of the clear, concise and definitive description given hereinbelow of a specific embodiment of the application of the fundamental concepts underlying my invention, not as a limitation thereof but for purely exemplary purposes which are likewise illustrated in the annexed forming a part of this disclosure.

Therefore Figure 1 is a partially broken away vertical section view of the retractable roof top and lid in an erected position.

Figure 2 is a view somewhat similar to Figure 1 but showing the roof top partly withdrawn within the trunk lid.

Figure 3 is similar to Figure 1 but showing the roof fully retracted within the lid.

Figure 4 is a partial vertical section showing the trunk lid containing the retracted roof in an open position.

Figure 5 is a partial vertical section showing the trunk lid assembly construction.

Figure 6 is a top view partially broken away showing arrangement of the various elements.

Figure 7 is a partial vertical detail section of the trunk lid pivot assembly and junction between the rails.

Figure 8 is an enlarged section taken along line 8—8 of Figure 3.

Figure 9 is a sectional view of the trunk lid pivot arrangement.

Figure 10 is a view partly in phantom showing the details in vertical section of the latching and springing arrangement.

Figure 11 is an end view, partially broken, taken along line 11—11 of Figure 10.

Figure 12 shows the various sections of the seal at various points indicated in Figure 6, And Figure 13 is a detailed drawing of one of the rollers supporting the trunk lid as it rides over the roof top.

In the illustrations, certain reference characters are applied to certain portions thereon to point out specifically certain elements of my invention and these reference characters are used hereinbelow in the same capacity.

My improved automobile retractable roof assembly in combination with an automobile comprises a suitable automobile body 20, wherein the actual roof portion 22 and the trunk lid deck 24 are of a somewhat similar contour so that the roof 22 can be telescoped within or rather beneath the lid deck 24, which is clearly illustrated in Figures 2, 3 and 4. Obviously the roof 22 and the lid 24 beneath which it is stored can vary somewhat in design but the preferred embodiment is that illustrated since I do not sacrifice the storage space within the trunk 26 of the automobile.

My improved retractable roof construction comprises essentially a roof 22 and the trunk means or assembly 44 by which the roof 22 can be inserted and stored beneath the trunk lid or deck 24 without interference or loss of trunk space and its utility.

The roof 22 preferably made of a rigid or reenforced material such as steel, plastics or the like, has at its forward end 28 and rear end 30 along both sides thereof respectively rollers 32, and 34, which when the roof 22 is in the normal position are supported by and ride within a suitable channel or rail 36, and when retracted and underneath the trunk lid 24 are supported by and ride within the lid channels or rails 38. The forward rollers 32 are attached to the roof 22 by means of curved brackets 40 that extend forwardly and downwardly and ahead of the front edge 28 of the roof 22. Likewise, the rear rollers 34 are supported on brackets 42 which are angularly disposed in a somewhat forward and in relation to the rear end or back edge of the roof 22.

The roof rail 36 and trunk lid rail 38 essentially are continuous except for the junction 39 which is broken when the trunk lid assembly 44 is raised for entry into the trunk compartment 26. The rails 36 and 38 essentially are similar in cross section and preferably are of an upright U-shape with inwardly turned flanges or extensions 46 between which is a longitudinal slot 48 on the top surface and in which the brackets 40 and 42 are slidably engageable. The rollers 32 as well as rollers 34 are retained within the interior of the channels or rails 36 and 38 and maintain the roof in juxtaposition either on the top of the car or within the trunk lid assembly 44.

The top or roof rail 36 has at the front end thereof seating or clinching sections 35 which are an integral part of the respective rails. These extend or are inclined downwardly and forwardly slightly in relation to the rails 36 and so designed that when the front rollers 32 are dropped into this declined rail section the roof top 22 can be snugged down against the weather seal by means of the draw latch 50 on the front edge of the roof 22. The same action takes place at the rear edges of the roof wherein the top rails 36 are provided with similarly designed and integral clinching sections 37. These rear clinching extensions or sections 37 are in fact in the same path as the rails within the trunk lid so that the rear rollers 34 fall readily into these clinching sections as the roof is drawn up. However as indicated above this rear extension is an offset integral part of the roof rail 36 and has portions of the webbing cut away so that the rear brackets 42 can enter within the clinching portion 37. It should be further noted that the front clinching sections 35 as well as the rear clinching sections 37 are set in a parallel relationship to each other so that the roof 22 can settle down simultaneously when the rollers drop into the clinching sections and then be drawn into a locked position by means of the drawing latch 50 on the roof 22, against the lock portion attached to the front window framing 52.

Though the design of these clinching sections 35 and 37 may vary somewhat depending on the angle of the bracket which may or may not be used in connection with the rollers, it is preferred that they slope downwardly and forwardly and preferably in a parallel relationship to each other regardless of their position or relation to the rollers just so long that the rollers may be able to enter and leave the same easily and conveniently and the roof top 22 can be drawn into a tight fit with the gasket or weather seal 54 when the drawn lock is closed.

The gasket or weather seal 54 may be made from any suitable material such as rubber, foam rubber, plastics, styrene and butyl rubbers, elastomers etc.

The trunk lid assembly 44 comprises a cover or lid 24, a framing 56, which may or may not be formed integrally with the rails 38, and a means to support the said framing in proper juxtaposition to receive the retractable roof top, as well as a means to open the trunk lid for access to the interior 26 of the trunk. The framing 56 consists of a trunk lid bottom made from a wide, U-shaped channel or plate 58 having extending therefrom curvilinear sides (not illustrated for sake of clarity) which in the preferred embodiment comprises the side guide rails 38 and the open top end or opening into which the roof 22 is inserted when it is placed into the framing. To cross brace the side framing members or rails 38 as shown in the preferred embodiment, I employ space bars 60 which are placed at selected intervals and which are welded preferably to the sides of the rails 38. To the bottom or lid channel spacer plate 58, I weld or otherwise secure the ends of the guide rails 38 while the upper ends of said guide rails 38 are welded or otherwise secured to the pivot bearing plate 62. This plate 62 rotates about the pin or pivot shaft 64, which in turn is supported by the bracket 66 that is attached to the body 20 of the automobile. The side guide rails 38 are thus pivoted or are able to turn about the pin shaft 64, and when the trunk lid assembly is raised the end above or ahead the pivot shaft 64 dips downwardly into the forward end of the trunk compartment 26, but the lower end rises to provide access to the interior of the trunk without any effect on anything stored within the trunk lid assembly 44.

The lower end of the framing 56 as mentioned previously has a spacer plate or lid bottom 58. This spacer plate 58 is of a sufficient width to space apart the side members or guide rails 38 from the trunk lid or cover 24 so that the roof top 22 may fit into the space between the guide rails and the cover. To the other side or leg of the spacer plate 58, there may be welded directly the hinge 68 itself or still better and to obtain additional reenforcing to the trunk cover there may be placed a horizontal or transverse sheet 72; the hinge can be attached to this sheet 72. The usual trunk handle and lock 70 are also provided to facilitate the opening and closing of the trunk lid.

The upper part or leading edge 25 of the lid 24 is cantilevered from one side to the other side and also from the pivot shaft, to conform to the shape and contour substantially to that of the roof top as shown in Figure 11 and so that it will fit snugly about the end of the roof deck 22. The edge 25 may be turned in to have thereon a reenforcing ribbing upon which suitable gasket material 54 is placed so that the cross sections thereof adequately protect the interior of the automobile against leakage of the elements. These sections are shown in Figure 6 and enlargements of the same are also shown in Figure 12. A similar reenforcing roll rib 23 is provided for the rear edge of the roof top 22.

In order to provide additional support for the edges of the framing 56 which as indicated previously may not be necessary under some conditions of design, there are provided a series of supports 74 which in turn are attached to the body of the automobile.

Likewise to prevent the roof top 22 from rattling and possible damage while it is stored within the trunk lid assembly 44, I provide suitable shock absorber helical springs 76 that are placed within the channel or rails 38 and upon which the rollers 34 impinge when the roof is dropped down into the well.

Also to help further to prevent rattling of the roof top within the trunk lid assembly 44, there are provided a series of rollers 78 which are fastened beneath the trunk lid or cover 24 and permit the lid to ride over the roof top 22 when the latter is placed into the storage well within the trunk lid assembly 44. The rollers 78 are mounted upon a shaft 80 held by a shaft holder 82. The shaft holder 82 together with a spring 94 preferably of the saddle type is mounted within a bracket 84. The bracket 84 has two right angle legs 86 and 88 extending therefrom in which are longitudinal slots 90 and which carry the pins 92 that support the bracket or shaft holder 82. These pins 92 ride vertically within the slots 90 whenever the roof deck or top 22 is jarred while in the storage well of the trunk lid assembly 44. The brackets 84 are welded to the underside of the trunk lid 24, at the selected places so that the rollers 78 will ride on the highest portion of the roof top 22.

To keep the trunk lid 24 down and in a locked position, I provide a latch 96 of the spring pivot type which is attached to the underside of the trunk lid 24 along the edge thereof. A suitable catch 98 is provided in juxtaposition with the said latch 96 so that the spring tensioned latch 96 can fold back and snap shut as the lid 24 is pressed downwardly against the C springs 100. One end of said C spring is mounted on the pivot bracket plate 66, the other end of said C spring rides within a walled saddle 102 which is mounted on the underside of the edge of the trunk lid 24. When the latch 96 is released by means of the spring tensioned trigger 104 pivotedly mounted on the framing of the car 20 and which is operated by the cable release 106 when the latter is operated by the occupant of the car who actuates a suitable handle mounted on the dashboard (not shown), then the lid 24 under the urging of the C springs 100, is sprung open either to receive the roof top or to permit its withdrawal from within the trunk lid assembly 44.

In order to operate my device, I release the latch 96 by means of the cable 106 operated from within the interior of automobile. Upon release of the latch 96, the C springs 100 force open the lid 24 about the hinge 68. I next unlatch the draw lock 50 at the forward end of the roof top 22 and by means of the handle 108, I gradually force the roof top 22 upwardly to disengage it and lift it from within the recesses of the clinching extensions 35 and 37. It now can be slid backwardly over the rails 36 and 38 into the trunk lid assembly 44. As the roof top drops into the cavity within the trunk lid assembly the rearmost rollers 34 contact the snubbers 76 which absorb the shock of the drop. The lid 24 is now pushed down on the roof top 22 and the spring tensioned rollers 78 will retain it rattle free. At the same time that the lid is being shut the C spring 100 is likewise being tensioned so that when the latch 96 is released from its contact with the lock 98 it will open the lid 22.

To open the trunk lid with the roof therein, all that is necessary is to open the trunk upward by the handle 70 and swing the lid about the pivot shaft 64. Thus the interior of trunk compartment is readily available for use free of obstructions. There is no interference with the utility and usefulness of the automobile trunk.

To retract the roof 22 from within the trunk lid assembly 44, the operator releases again the latch 96 by means of the cable pull 106 from within the interior of the automobile. The lid 24 will pop open and the roof top 22 can be drawn upwardly along the track 38 and 36 by means of the handle 108 until the rollers 32 and 34 drop into their respective clinching sections or wells 35 and 37. At this point the roof latch of draw type 50 engages the catch on the front frame of the automobile body and is drawn tight so that the roof is sealed against the weather by means of the gaskets 54.

Though the above disclosure is for sake of simplicity illustrated and described as a manually operated device, it is clearly obvious that the same can be outfitted with automatic means that will open and close the roof in proper timed sequence with a suitable power means. It therefore is not intended to be limited to the specifically described and illustrated forms of this invention for obviously the same may be applied with equal facility and adapted to other uses so long as the fundamental concepts underlying this invention as defined in the hereunto appended claims are used.

I claim:

1. In combination with an automobile body, a retractable roof top, a trunk lid assembly, the said trunk lid assembly comprising a lid, a framing to support said lid and to receive therewithin the said retracted roof top, a hinge means adjacent the bottom end of said lid and to the related portion of said framing whereby the said trunk lid can be opened rearwardly adjacent the top end to permit the slidable entry of the said roof top beneath the said trunk lid and within the said framing, pivot means mounted adjacent the upper portions of the sides of said framing in juxtaposition with the opening in the automobile for said trunk lid assembly, whereby the said framing, the said lid cover hingedly mounted thereon and the said roof top, if retracted within the said framing, can be raised as a unitary assembly to act as a trunk lid revolving about said pivot means to provide access to the interior of the trunk compartment; means attached to and supporting said roof for sliding movement, guide rails adjacent the top of the said automobile body and similar guide rails mounted within the said framing in alignment with each other at their junction to provide a clear way for the said slidable movement means mounted on said roof top, a detent mounted on said framing to keep the top end of said lid secured adjacent the upper part of said framing and to retain, if present, the retractable roof, between the said lid and the said framing; retaining means adapted to engage said slidable movement means with said automobile body and a locking means to fix said roof top in juxtaposition with said automobile body.

2. In the combination of claim 1, wherein the said means attached to and supporting said roof for sliding movement are rollers mounted on brackets attached to the edges of said roof top, the said rollers are retainable within the said guide rails, whereby the roof top is supported in juxtaposition with either the said automobile or within said trunk lid assembly.

3. In the combination of claim 2 wherein the said brackets are mounted at the ends of the longitudinal edges of said roof top.

4. In the combination of claim 3 wherein the brackets on the forward ends are mounted in a downwardly and forwardly angular relation to the general horizontal plane of the said roof top.

5. In the combination of claim 1, wherein the said means for slidable movement are rollers attached to the said roof top at preselected positions and the said rollers are retainable within the said guide rails.

6. In the combination of claim 1, wherein the said guide rails have U-shaped sections, and inwardly facing legs across the opening thereof, to form therebetween a longitudinal slot.

7. In the combination of claim 6, wherein the said guide rails retain therein the said means attached to and supporting said roof for sliding movement, and a bracket riding in said longitudinal slot having attached on one end thereof the said means attached to and supporting said roof for sliding movement and the other end thereof supporting the said roof top.

8. In the combination of claim 6, wherein the said guide rails conform in contour to the roof top and carry the said roof top to similarly shaped guide rails mounted within the said framing of the said trunk lid assembly, and the said guide rails have a break joint where the roof top back wall and the forward end of the said trunk lid meet.

9. In the combination of claim 1, wherein the sides of said framing and said guide rails within the said trunk lid assembly are similar in vertical contour.

10. In the combination of claim 1, wherein the said detent to keep the lid shut comprises a spring actuated bell-crank, a bracket adapted to support said bell-crank attached to the underside of said lid, one arm of said bell-crank having thereon a tooth to engage a catch, a catch mounted in engageable relation with said bell-crank arm on said bracket, a second bracket attached to said framing, a spring tensioned pivotable dog attached to the automobile framing, and a cable leading from under the dash to one arm of said dog, the other arm of said dog being in operatable juxtaposition with the free arm of said bell-crank, whereby when the said cable is pulled, the pivotable spring tensioned dog swings about to engage the free arm of said bell-crank, and disengages the toothed arm from said catch.

11. In the combination of claim 1, wherein the said retaining means on the top guide rails consist of integral extensions of the same, the said extensions being offset from the general horizontal plane of said roof top, downwardly and forwardly in parallel substantial juxtaposition to each other whereby when the rollers are engaged thereby the roof top is clinched into a tight fit with a weather seal on the edge of the body.

12. An automobile body, a slidable roof on said body, detents to hold said slidable roof in juxtaposition with said body, a pivoted trunk lid assembly, into which the said roof top can be retracted, the said trunk lid assembly comprising a framing substantially U-shaped and of the same contour as said roof, side rails forming the sides of said framing, a spacer plate at the bottom of said framing, the ends of said rails being attached to one edge surface of said spacer plates, the other ends of said rails being attached to a pivoted plate, the other surface of said spacer plate having thereon a transverse supporting plate, a hinge attached to said supporting plate and a lid cover, whereby the said lid is tiltable rearwardly, a latch means on the underside of the upper portion along the edges of said lid, a catch attached to said pivoted plate for engaging said latch means, a trigger arrangement to release said latch from engagement with said catch operatable from within the automobile, spring tensioned rollers mounted on the under surface of said lid to retain the roof top in a rattle-free position within the said framing; a pivot to support said pivot plate, the said framing members and said trunk lid assembly, the said pivot being attached to said frame above its center of gravity whereby the trunk lid assembly may be opened for entry into the trunk compartment; rails on top of said body in juxtaposition with said detents and said rails within the said trunk lid assembly, and a means to retain said roof top in slidable contact with said rails whereby the said roof top can be transported along said rails into and out from said trunk lid assembly.

References Cited in the file of this patent

UNITED STATES PATENTS

| | | |
|---|---|---|
| 1,774,199 | Good | Aug. 26, 1930 |
| 1,933,623 | Gordon | Nov. 7, 1933 |
| 2,024,049 | Mahon | Dec. 10, 1935 |
| 2,105,293 | Paulin | Jan. 11, 1938 |
| 2,181,869 | Carr | Dec. 5, 1939 |
| 2,234,040 | Carr | Mar. 4, 1941 |
| 2,471,378 | Shilala | May 24, 1949 |

FOREIGN PATENTS

| | | |
|---|---|---|
| 493,260 | Belgium | Jan. 31, 1950 |